April 6, 1965  H. M. QUIOT  3,177,487
ALTIMETER WITH FREQUENCY-MODULATION
Filed April 23, 1962
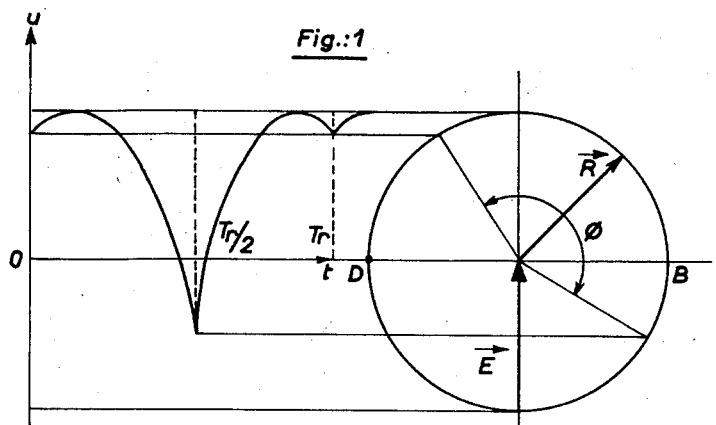
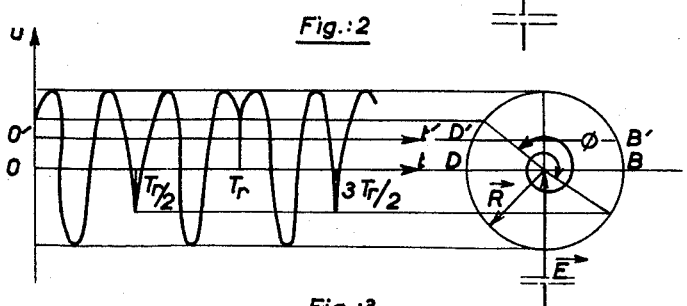
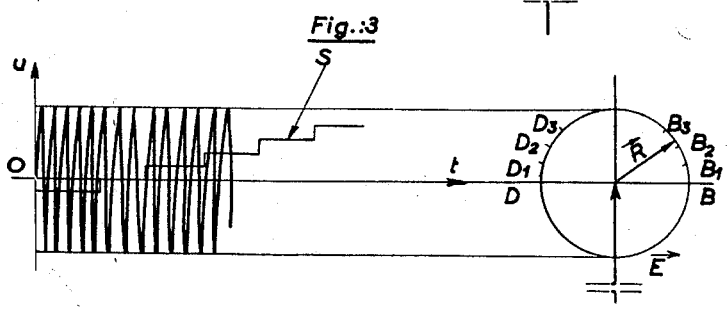
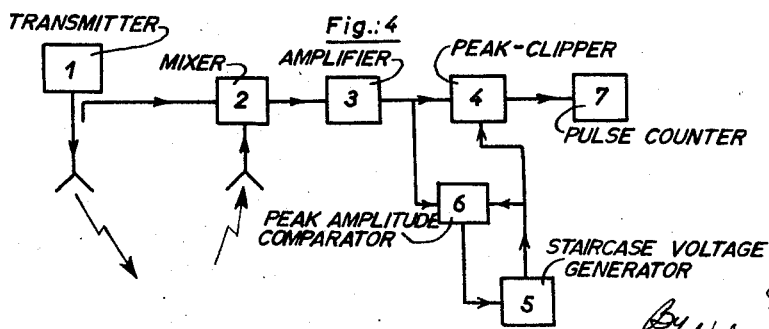
INVENTOR
Henri M. Quiot
By Watson, Cole, Grindle + Watson
ATTORNEYS

United States Patent Office 3,177,487
Patented Apr. 6, 1965

3,177,487
ALTIMETER WITH FREQUENCY-MODULATION
Henri Maurice Quiot, Issy-les-Moulineaux, France, assignor to Société Nationale d'Etude et de Construction de Moteurs d'Aviation, Paris, France, a company of France
Filed Apr. 23, 1962, Ser. No. 189,569
Claims priority, application France Apr. 29, 1961
3 Claims. (Cl. 343—14)

Radio-electric echo sounders are already known in their application as altimeters using frequency modulation in accordance with the following principle: the received signal, after reflection from the ground, is mixed with the signal derived from the transmitter so as to give a resultant signal in the form of a beat frequency.

If the transmitted voltage $\vec{E}$ and the received voltage $\vec{R}$ are represented vectorially, there is obtained a diagram such as shown in FIG. 1, in which the position of the vector $\vec{E}$ has been taken as the origin of the phases. The vector $\vec{R}$ rotates in the direct sense when the transmitted frequency increases and in the reverse sense when that frequency decreases. The angle $\Phi$ which it describes depends on the frequency excursion, that is to say on twice the value of the difference $\Delta F$ between the mean value of the frequency range due to frequency modulation and the extreme limit values of said frequency range.

It can be be shown that this angle is furthermore proportional to the time $T$ taken by the emitted wave to travel to the ground and then to return to the aircraft:

$$\Phi = 4\pi \Delta F \cdot T$$

The time $T$ is in turn proportional to the altitude $H$:

$$T = \frac{2H}{C}$$

in which $C$ is the speed of propagation of the wave in air. Therefore, $$\Phi = \frac{8\pi}{C} \cdot \Delta F \cdot H$$

Thus the measurement of the angle $\Phi$ gives the desired indication of altitude.

If the transmitted voltage $\vec{E}$ is very great as compared with the received voltage $\vec{R}$, the beat-frequency voltage $u$ can be represented by the projection of $\vec{R}$ on $\vec{E}$. The beat-frequency voltage or altimetric voltage passes through zero every time when $\vec{R}$ is in quadrature with $\vec{E}$.

The method generally employed on known radio-altimeters consists in measuring the angle $\Phi$ by counting the number of zeros of the beat-frequency voltage in a half-period $T_r/2$. Under these conditions, it is established that the angle $\Phi$ is measured with an accuracy (i.e., maximum divergence from the mathematically correct value) equal to $\pi$ radians, giving a fixed error of altitude which has the value $\Delta H = C/8\Delta F$ (cf. "Altimetre Electronique de Precision" by L. Couillard, pp. 166–168, from A.E.R.A. Premier Congres International, Paris, 1953–54, editor Dunod). The fixed error is not due to the principle of the altimeter, but to the manner in which the signals are utilized.

It has been found that this error is only a function of the amplitude of the frequency excursion. It can therefore be reduced by increasing the frequency excursion, but this presents certain difficulties in achievement.

The present invention relates to a method which enables the fixed error to be substantially reduced without at the same time increasing the frequency excursion to an excessive degree.

The invention has for its object a very simple and easily produced circuit which enables this fixed error to be reduced by means of the super position of a staircase wave of suitable amplitude on the input stage of the amplitude-limiter circuit.

The description which follows below with reference to the accompanying drawings, which are given by way of example only and not in any limitative sense, will make it quite clear how the invention may be carried into effect, the particular features brought out either in the text or in the drawings being understood to form part of the said invention.

FIGS. 1 and 2 are graphs and vector diagrams to which reference has already been made.

FIG. 3 is a similar graph and vector diagram which illustrates the method employed in the present invention, FIG. 4 is a block diagram of a radio-altimeter designed in accordance with the invention.

It has been seen above that in order to determine the angle $\Phi$, it is sought to determine the number of zeros of the beat or altimetric voltage during the time $T_r/2$ or, which amounts to the same thing, the number of passages of the vector $\vec{R}$ through the points B and D of FIGS. 1 and 2, when this vector described the angle $\Phi$.

In order to do this, a small section of the beat voltage located on each side of the axis $Ot$ is amplified with successive amplitude limitation, and the forward and rear wave-fronts of the signals thus obtained are counted. As has already been indicated, there is thus made an error equal to $\pi$ in the measurement of $\Phi$.

It is possible, by modification of the thresholds of amplitude limitation, to amplify a section of signal in the vicinity of the axis $O't'$ (FIG. 2), which is equivalent to determining the number of passages of the vector $\vec{R}$ through the points B' and D'.

In accordance with the present invention, the threshold of amplitude limitation is varied in saw-tooth form as a function of time, with an amplitude of the staircase waveform equal to the peak altimetric voltage before limitation and with a frequency $f\varphi$ which is much smaller than the modulation frequency $f_r$, so that during the time $T_r/2$, the amplitude-limitation threshold may be considered as fixed. It can be seen that at each half-period of $T_r/2$, the points B and D corresponding to the peak-clipping threshold will recur successively at $B_1, B_2, B_3 \ldots$ and at $D_1, D_2, D_3 \ldots$ (FIG. 3) with:

$$BB_1 = B_1 B_2 = \ldots = DD_1 = D_1 D_2 = \ldots f\varphi/f_r$$

At the end of a half-period of the saw-teeth having the frequency $f\varphi$, the points B and D will each have described the half of the circle.

By making the sum of all the forward and rear wave fronts obtained during the half-period $\frac{1}{2}f\varphi$, the value of the angle $\Phi$ is obtained with an accuracy which is no longer equal to $\pi$, but to $\pi f\varphi/f_r$, which reduces the fixed error in the ratio of $f\varphi f_r$.

A circuit for carrying this method into effect can be obtained by modulating with staircase waves the grid of the peak-clipper tube. FIG. 4 shows by way of example a circuit diagram for an embodiment of this kind.

In this diagram, 1 represents the transmitter sending waves from the transmitting aerial, which after reflection from the ground, are collected by the receiving aerial. The transmitted signal and the received signal are applied to a mixer 2 which is connected to an amplifier 3 having a non-saturated output stage. The beat resulting from the mixture of the signals, that is to say the altimetric signal, is then sent to an amplitude-limiting or peak-clipping stage 4, the peak-clipping threshold of which is modulated by a staircase voltage supplied from a suitable generator 5.

The amplitude of this staircase voltage is regulated from a peak amplitude comparator 6, so as to have its peak value maintained constantly equal to that of the beat voltage supplied by the unsaturated stage 3.

The impulses delivered from the peak-clipping stage 4 are finally applied to an impulse counter 7 which supplies the desired altimetric indication.

In order that the circuit may function suitably, it is necessary that the section of signal obtained during a half-period $\frac{1}{2}f_r$ should comprise at least one full sine wave (that is to say, the time taken by the signal to travel from the aircraft to the ground and back should be at least equal to $3\Delta H/C$, which makes it possible to have an angle $\Phi$ equal to or greater than $3\pi/2$). This can be readily obtained, even at zero altitude, by interposing a suitable length of feeder between the transmitter and the transmitting aerial or between the receiver and the receiving aerial.

It will of course be understood that modifications may be made to the form of embodiment which has just been described, in particular by the substitution of equivalent technical means, without thereby departing from the scope of the present invention.

What I claim is:

1. In a frequency-modulated radio-altimeter of the type having, in succession assembly, a signal transmitter, a mixer of the transmitted signal and corresponding echo signal, which produces a beat-frequency voltage, and a pulse counter, the improvement comprising a peak-clipper stage having an input to which said beat-frequency voltage is applied and an output connected to said counter, and a staircase voltage generator having a frequency substantially lower than the modulation frequency and connected to said peak-clipper stage to apply thereto said staircase voltage.

2. A radio-altimeter as claimed in claim 1, comprising further means for adjusting the staircase voltage amplitude to a value substantially equal to the peak value of the beat-frequency voltage before the latter is applied to the peak-clipper stage.

3. A radio-altimeter as claimed in claim 2, wherein the staircase voltage amplitude adjusting means comprise a peak amplitude comparator having an input connected with the input of the peak-clipper stage to tap therefrom the beat-frequency voltage, a further input connected with the output of the staircase voltage generator to tap therefrom the staircase voltage, and an output connected with said generator to control the peak amplitude of the staircase voltage generated thereby.

References Cited by the Examiner
UNITED STATES PATENTS 2,572,788   10/51   Weighton _____ 324—78
2,867,767   1/59    McGillem et al. _____ 324—78

CHESTER L. JUSTUS, *Primary Examiner.*